(12) United States Patent
Davis

(10) Patent No.: US 7,770,902 B1
(45) Date of Patent: Aug. 10, 2010

(54) IN-ARM COMPRESSIBLE FLUID SUSPENSION SYSTEM

(75) Inventor: Leo W. Davis, Addison, TX (US)

(73) Assignee: Horstman, Inc., Washington, MI (US)

( * ) Notice: Subject to any disclaimer, the term of this patent is extended or adjusted under 35 U.S.C. 154(b) by 485 days.

(21) Appl. No.: 11/728,034

(22) Filed: Mar. 23, 2007

(51) Int. Cl.
 *B60G 17/015* (2006.01)
(52) U.S. Cl. .................. 280/5.5; 180/9.5; 180/9.52; 180/9.54; 280/5.514; 280/124.157; 280/124.161; 305/127
(58) Field of Classification Search .................. 280/5.5, 280/5.507, 5.514, 124.157, 124.16, 124.161; 180/9.5, 9.52, 9.54, 9.58; 305/127
See application file for complete search history.

(56) References Cited

U.S. PATENT DOCUMENTS

| | | | |
|---|---|---|---|
| 3,047,283 A * | 7/1962 | Kivell | .................. 267/201 |
| 5,152,547 A | 10/1992 | Davis | |
| 5,779,007 A | 7/1998 | Warinner | |
| 6,389,341 B1 | 5/2002 | Davis | |
| 7,475,895 B2 * | 1/2009 | Stacey et al. | ........... 280/124.16 |
| 2004/0232632 A1 * | 11/2004 | Beck et al. | .................. 280/5.5 |
| 2007/0080001 A1 * | 4/2007 | Beck et al. | ............... 180/24.07 |

FOREIGN PATENT DOCUMENTS

WO   WO 2006/047353 A2   5/2006

* cited by examiner

*Primary Examiner*—Eric Culbreth
(74) *Attorney, Agent, or Firm*—Mark W Handley

(57) ABSTRACT

An in-arm suspension (12) is provided for actively controlling a suspension arm (20) mounted to a vehicle frame (14). The suspension arm (20) has a housing (60) in which the a compressible fluid strut (32) and a fluid control section (90) are enclosed. The compressible fluid strut (32) includes a cylinder (134) and a piston rod (136) which is urged to extend from within the cylinder (134) in response to fluid pressure applied to compressible fluid disposed within the cylinder (134). A damper piston (174) is mounted to an interior portion of the piston rod (136), and moves with the piston rod (136) to pass the compressible fluid through the damper piston 174 and attenuate bounce and rebound of the piston rod (136) within the cylinder (134). A damper lock (210) is mounted to the piston rod (136) for selectively preventing the flow of compressible fluid through the damper piston (174).

19 Claims, 7 Drawing Sheets

IN-ARM COMPRESSIBLE FLUID SUSPENSION SYSTEM

TECHNICAL FIELD OF THE INVENTION

The present invention relates in general to independent vehicle suspensions, and in particular to active, independent suspensions having compressible fluid struts.

BACKGROUND OF THE INVENTION

Prior art suspension systems have been provided for vehicles to isolate the vehicle frame, or chassis, from impacts and vibrations resulting from vehicle wheels traversing uneven terrain. Vehicle ride characteristics have complex dynamics characterized by nonlinearities, vehicle roll and pitch, vehicle flexibility effects, varying parameters, unknown friction, dead zones and high amplitude disturbances. Excess vibration results in artificial vehicle speed limitations, reduced vehicle-frame life, biological effects on passengers and detrimental consequences to cargo. Present suspension systems traditionally use passive suspension systems which can only offer a compromise between the two conflicting criteria of comfort and performance by providing spring and dampening coefficients of fixed rates. Passive suspension systems have been provided by separate coil springs and shock absorbing dampers, in which power is not input by a controlled power source to counteract impacts and vibrations resulting from traversing the rough terrain. The traditional engineering practice of designing spring and dampening functions as two separate functions has been a compromise from its inception in the late 1800's. As a result, vehicles have always been designed, styled and built around the space-weight requirements and performance limitations of traditional suspension configurations.

To provide increased mobility and stability, independent passive suspensions have been developed which have proven their worth in improved mobility over rough courses, but high wheel travel has sacrificed improved stability. Active suspension systems provide a solution for improved stability, as well has providing improved mobility. Active suspension systems reduce these undesirable ride characteristics by providing active, powered components which isolate the car body from tire vibrations induced by uneven terrain, to provide improved comfort, road handling performance and safety for a variety of terrains and vehicle maneuvers. In active vehicle suspension systems, actuators are provided to actively apply forces which counteract and balance forces applied to the chassis of the vehicle.

Off-road capable military vehicles provide special demands upon suspension systems. In battle conditions, to enhance survivability vehicles are often required to move at high speeds over rough terrain. As such speeds, damage to the vehicle and riders in a vehicle may occur due to jouncing of the vehicle, in addition to loss of stability leading to vehicle roll-over. Suspension ride characteristics over rough terrain is also complicated by differences between laden and unladen weights of the vehicles becoming so broad that traditional suspension systems are unable to span the load range effectively, causing serious degradation in performance of the vehicle ride quality, load handling and control.

Mobile firing platforms, such as military tanks, vehicles to which cannons and missile launchers are mounted, and such, add the additional constraint that vehicle suspensions be capable of locking at a particular ride height to provide the ability to accurately aim weapons mounted on the platform. After weapons producing large recoil are fired, it is desirable that vehicle suspensions quickly absorb the recoil and associated vibrations so that the weapons may be fired more rapidly than if the suspensions took longer times to absorb the recoil vibration. For motorized, mobile weapons systems, such as military tanks, it is desirable that the suspension may be quickly locked, stabilized after firing, and then unlocked again to allow maneuverability over rough terrain between firing locations.

SUMMARY OF THE INVENTION

A novel swing arm suspension compressible fluid system provides an active independent suspension system contained within a single suspension arm. The in-arm suspension includes a compressible fluid strut, and a fluid control system for actively controlling operation of the compressible fluid strut. The in-arm compressible fluid strut preferably has a cylinder which defines a sealed chamber and a piston rod which extends into the cylinder, such that pressure applied to a compressible fluid in the cylinder chamber urges the piston to extend from within the cylinder. The compressible fluid strut performs three basic functions of suspension systems in a single component, acting as a fluid spring, a shock absorber and an actuator. Preferably, the strut includes a piston damper which seals between the cylinder and the piston rod, and includes flow passages for passing the compressible fluid between bounce and rebound portions of the sealed chamber. The fluid control system operates to determine an amount of the compressible fluid disposed within the sealed chamber defined within the cylinder of the compressible fluid strut. The fluid control system may include an in-arm computer for determining movement of the suspension components and generating control signals for changing the mass and force of the compressible fluid in the sealed chamber. A central control computer may be provided for controlling the mass of compressible fluid in multiple compressible fluid struts for a vehicle, either solely, or in combination with an in-arm computer. When used in military applications for mobile firing platforms, the in-arm suspension provides means by which the flow passages in a piston damper may be selectively sealed to prevent flow of a compressible fluid through the piston damper, locking the piston rod in relative position to a cylinder to provide a stable firing platform until the piston rod is moved against the compressible fluid to absorb the recoil of a weapon being fired.

DESCRIPTION OF THE DRAWINGS

For a more complete understanding of the present invention and the advantages thereof, reference is now made to the following description taken in conjunction with the accompanying drawings in which

FIG. 1 is a partial perspective view of an in-arm suspension system mounted to a vehicle frame for supporting a wheel in engagement with a track;

FIG. 2 is a side elevation view of the in-arm suspension showing a ride height displacement of wheel in relation to the stator and track;

FIG. 3 is a side elevation view of the suspension showing the suspension arm after being rotated clockwise through an angular displacement to an upwards position, disposed above the reference datum plane at the ride height;

FIG. 4 is a front view of the suspension showing the suspension arm after being rotated clockwise through an angular displacement to an upwards position, disposed above the reference datum plane at the ride height;

FIG. 5 is an exploded, perspective view of the suspension arm, and shows various components of the suspension arm;

FIG. 6 is a side elevation view of the suspension arm after assembly, with the cover plate, the outer pivot plate and the tubing removed;

FIG. 7 is a schematic diagram mounting diagram of the fluid control section;

FIG. 8 is a longitudinal section view of the compressible fluid strut; and

FIG. 9 is an alternative strut made according to the present invention.

DETAILED DESCRIPTION OF THE INVENTION

Figure 1:
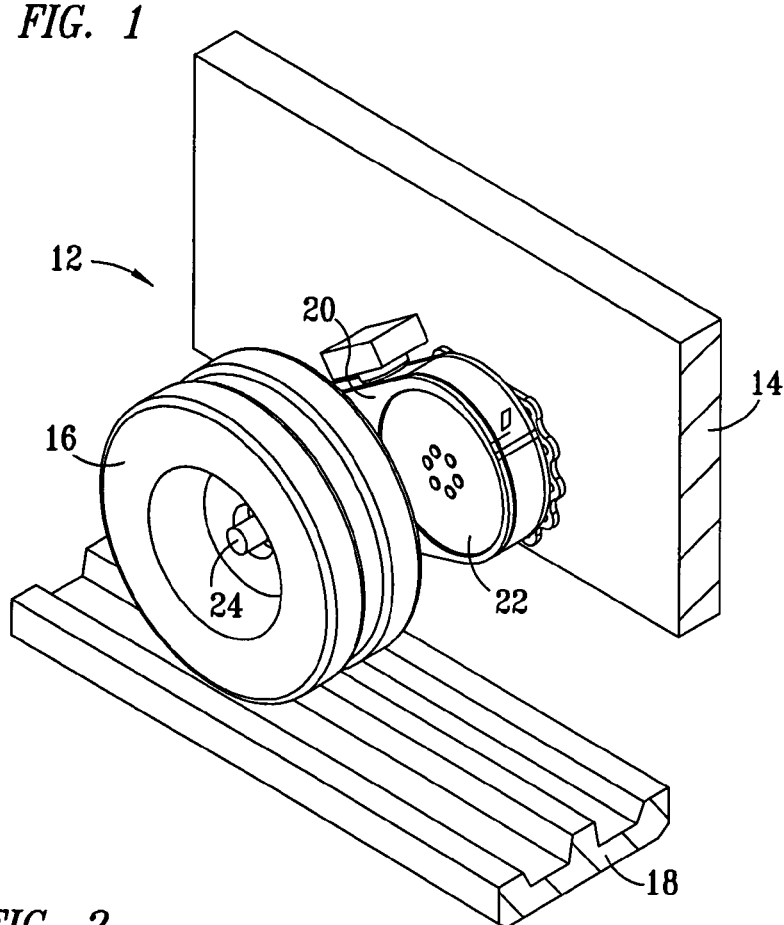
FIGS. 1 through 9 show various aspects for an in-arm compressible fluid suspension system made according to the present invention, as set forth below.

FIG. 1 is a partial perspective view of an in-arm suspension system 12 mounted to a vehicle frame 14 for supporting a wheel 16 in engagement with a track 18. The track 18 is preferably a continuous track which extends around a plurality of wheels 18, such as seven of the wheels 18. The in-arm suspension 12 includes a suspension arm 20 which is rotatably mounted to a stator 22. A spindle 24 is mounted to the suspension arm 20, distally disposed, or spaced apart, from the stator 22. The spindle 24 provides an axle to which the wheel 16 is rotatably mounted. The suspension arm 20 rotates the spindle 24 about the stator 22 for absorbing shock from bounce, or jounce, and rebound, and for determining the ride height for vehicle frame 14.

Figure 2:
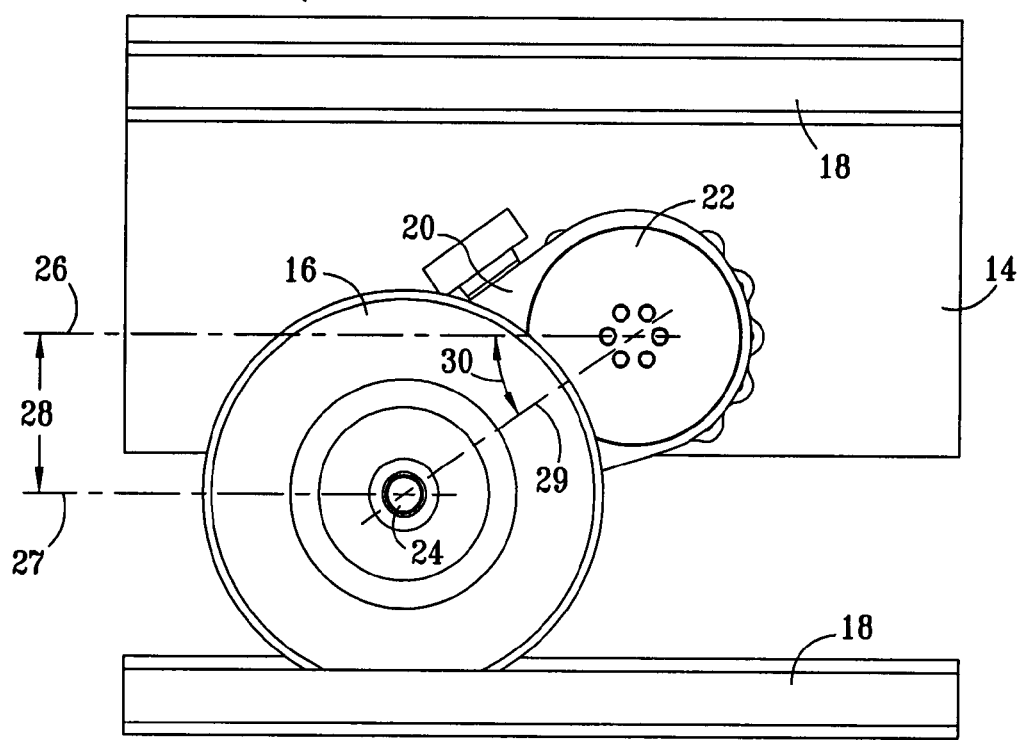

FIG. 2 is a side elevation view of the in-arm suspension 12 showing a ride height displacement 28 of wheel 16 in relation to the stator 22 and the track 18. The ride height displacement 28 is shown being determined by measuring between two projection lines 26 and 27, with the projection line 26 representing a first plane projected through the central axis of rotation for the suspension arm 20 defined at the center of the stator 22, and the second projection line 27 representing a second plane projected through the axial centerline of the spindle 24. When the vehicle frame 14 is disposed with various ones of the axes of rotation of the wheels horizontal, the planes represented by the projection lines 26 and 27 will preferably be horizontal planes. The suspension arm 20 has a central longitudinal axis defined by a third projection line 29 which extends through the geometric center of the stator 22 and the spindle 24. The suspension arm 20 has been rotated for an angular displacement 30 relative to a reference datum defined by the projection line 26 extending through the central axis of rotation for the suspension arm 20, defined by the stator 22.

Figure 3:
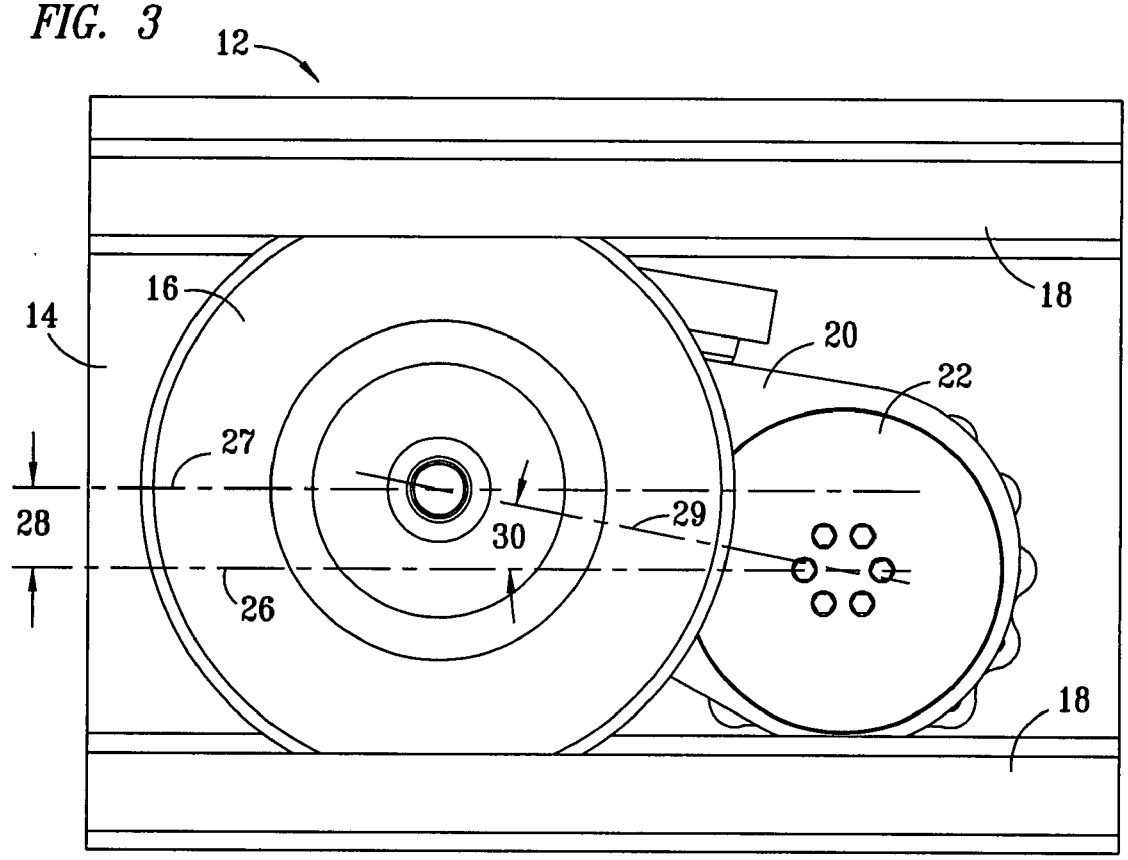
Figure 4:
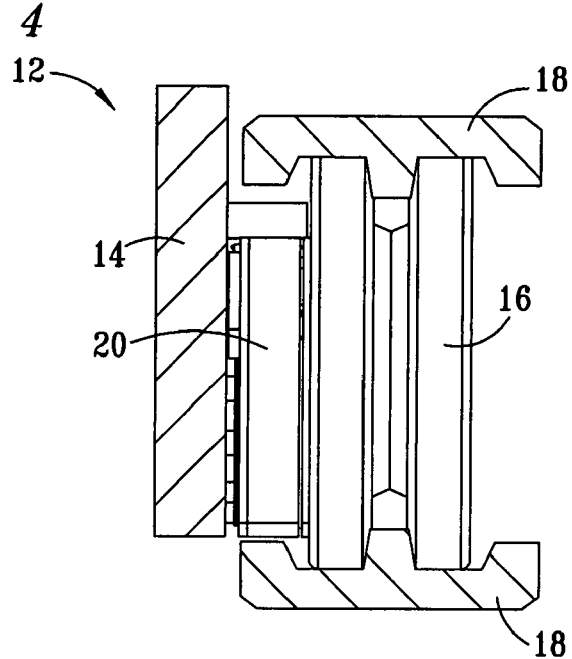

FIG. 3 is a side elevation view and FIG. 4 is a front view of the suspension 12 showing the suspension arm 20 after being rotated clockwise through an angular displacement 30 from the reference datum 26, to an upwards position disposed at the ride height 28. The wheel 16 is contacting the upper portion and lower portion of the track 18. The center line of the spindle 24 is located a vertical distance 28 above the reference datum 26, which intersects the center line of the stator 22.

Figure 5:
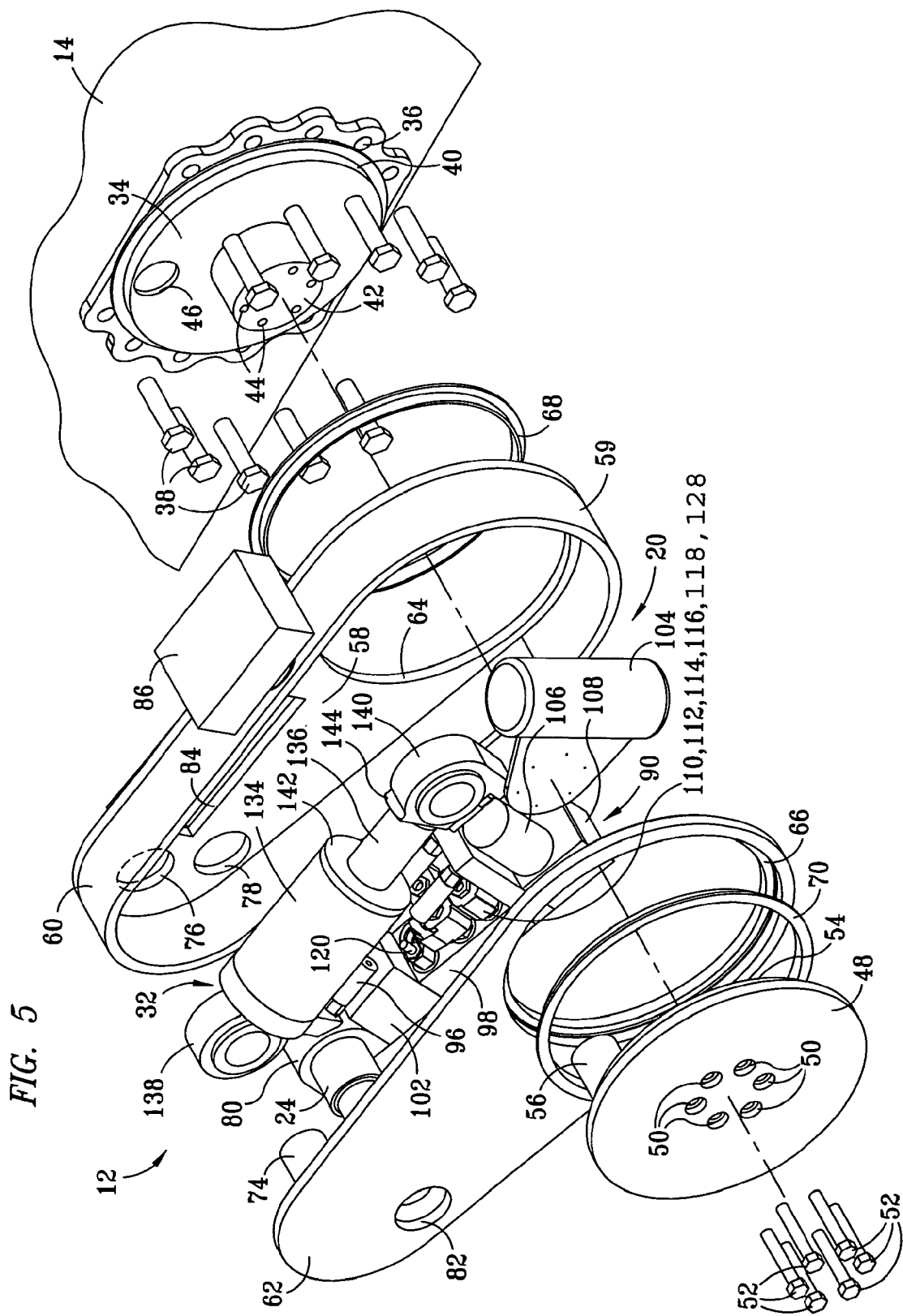

FIG. 5 is an exploded, perspective view of the suspension arm 20, and shows various components of the suspension arm 20. A compressible fluid strut 32 provides a linear actuator which powers angular rotation of the suspension arm 20. The compressible fluid strut 32 combines the spring function, the dampening function and an actuator function for the suspension arm 20 into a singular strut unit. The compressible fluid strut 32 has a cylinder 134 and a piston rod 136, with a bearing assembly 138 mounted to the cylinder 134 and a bearing assembly 140 mounted to the piston rod 136 for rotatably connecting the strut 32 between a stationary pin 56 and a moveable pin 74. A bump pad 142 is provided on the piston rod end of the cylinder 134 for engaging a reaction plate 144 located at an outward end of the piston rod 136 to limit movement of the piston rod 136 into the cylinder 134. The compressible fluid strut 32 is discussed in more detail below in reference to FIG. 8. The compressible fluid strut 32 is preferably mounted to the suspension arm 20, with a central axis of the bearing assembly 140 offset from the central axis of the stator 22 and a central axis of the bearing assembly 138 offset from the central axis of the spindle 24 to provide torque for rotating the spindle 24 about the stator 22.

The stator 22 includes a mounting flange 34 and an outer pivot plate 48. The mounting flange 34 is a disc-shaped member having a circumferentially extending edge portions defining eyes in which mounting holes 36 are formed. Mounting bolts 38 extend through the mounting holes 36 and into threaded holes in the vehicle frame 14 for mounting the flange 34 of the suspension arm 20 to the vehicle frame 14. The mounting flange 34 also includes a bearing surface 40 which circumferentially extends around the periphery of the mounting flange 34 to provide a bearing seat. The mounting flange 34 further includes a mounting boss 42 which has a plurality of threaded mounting holes 44 extending into the outer face of the mounting boss 42. A peripheral edge portion of the mounting flange 34 has a pin support aperture 46 formed therein for receiving the stationary pin 56 in a supporting arrangement. The outer pivot plate 48 is a disc-shaped member having mounting holes 50 for receiving bolts 52 which extend through the mounting holes 50 and into the threaded mounting holes 44 in the mounting boss 42 of the mounting flange 34 to threadingly secure the outer pivot plate 48 to the outward face of the mounting boss 42. The outer pivot plate 48 has a bearing surface 54 which circumferentially extends about a periphery of the pivot plate 48 to provide a bearing seat. The stationary support pin 56 is provided by a cylindrically shaped boss which is fixedly secured to and extends inward from a peripheral edge portion of the inward face of the outer pivot plate 48, and into the bearing assembly 140 for rotating the piston rod end of the compressible fluid strut 32 relative to the pin 56. The inward end of the stationary support pin 56 extends into the pin support aperture 46.

A suspension arm housing 60 and a cover plate 62 provide main structural support members for the suspension arm 20. The suspension arm housing 60 and the cover plate 62 have an oblong shape, or elongated shape, having a smaller diameter at the wheel end than at the stator end, adjacent to the mounting flange 34 and the outer pivot plate 48. The suspension arm housing 60 preferably has a flat portion providing a sidewall 58 of the housing 60, and a continuous enclosure portion 59 which extends perpendicular to the flat portion defining the sidewall portion 58. The enclosure portion 59 is preferably welded adjacent to a peripheral edge of the flat, sidewall 58. One side of the enclosure portion 59 is enclosed by the sidewall 58. The opposite of the enclosure portion 59 of the suspension arm housing 60 is open, and enclosed by mounting the cover plate 62 adjacent to the open side of the enclosure portion 59 in assembling in the suspension arm 20. The cover plate 62 is preferably a flat plate having an oblong shape, or elongated shape, having a smaller diameter at the wheel end of the plate 62 than at the stator end of the plate 62, adjacent the outer pivot plate 48. The cover plate 62 includes the moveable support pin 74, which is preferably provided by a cylindrically shaped boss which is fixedly secured to and extends from a peripheral edge portion of an inward face of the cover plate 62 for being rotatably received within the bearing assembly 138 of the compressible fluid strut 32. A pin support aperture 76 is formed in an end portion of the suspension arm housing 60 for receiving the movable support pin 74 in a supportive arrangement, such that the pin 74 is supported on opposite sides of the bearing assembly 138 by the cover plate 62 and the arm housing 60.

A mounting hole 78 is provided in the suspension arm housing 60 for receiving an inward end of the spindle 24. The pin support aperture 76 and the mounting hole 78 may be through holes extending through the sidewall of the arm housing 60, or blind holes into an outer inner side of the sidewall of the arm housing 60. A spindle support 80 is preferably welded to an interior side of the continuous enclosure portion 59 of the suspension arm housing 60 for providing a bearing for rotatably securing the spindle 24 to the housing 60. The cover plate 62 has an aperture 82 for passing the spindle 24 through the cover plate 62, and rotatably supporting the spindle 24. A strut support slot 84 is provided in the sidewall portion 58 of the housing 60, for supporting the cylinder 134 of the strut 32. A bump stop 86 is mounted on an exterior portion of the suspension arm housing 60 adjacent the track 18, preferably secured to the enclosure portion 59 to provide a stop for engaging a portion of the track 18 or the vehicle frame 14 to prevent further angular displacement of the suspension arm 20 when rotated to one of a fully retracted position, as shown in FIGS. 3 and 4, or in other embodiments, to fully extended position.

The suspension arm housing 60 has a circumferentially extending bearing surface 64 in an end disposed adjacent to the mounting flange 34, and the cover plate 62 has a circumferentially extending bearing surface 66 disposed adjacent to the outer pivot plate 48. A bearing ring 68 is provided for engaging between the bearing seat 40 of mounting flange 34 and the bearing seat 64 of the arm housing 60, providing an inner bearing member for rotating the suspension arm housing 60 relative to the mounting flange 34. The bearing ring 68 is preferably formed of heat conductive metal to for transferring heat from bearing seat 64 of the suspension arm housing 60 and the bearing ring 68 to the mounting flange 34 and the vehicle frame 14, which provides a heat sink. To enhance the heat transfer, the bearing 68 preferably has an L-shaped cross-section with two perpendicular sections, each section fitting between and flush against circumferentially extending, facing surfaces of the bearing seat 64 of suspension arm housing 60 and the bearing seat 40 of the mounting flange 34. Similarly, a bearing ring 70 is provided for engaging between the bearing seat 54 of the outer pivot plate 48 and the bearing seat 66 of the cover plate 62, which provides a bearing member for rotating the cover plate 62 relative to the outer pivot plate 48. The bearing ring 70 is preferably formed of heat conductive metal for transferring heat from bearing seat 66 of the cover plate 62 and the bearing ring 70 to the outer pivot plate 48, which is coupled directly to the mounting boss 42 of the mounting flange 34. The mounting flange 34 is coupled to the vehicle frame 14, which provides a heat sink. To enhance the heat transfer, the bearing 70 preferably has an L-shaped cross-section with two perpendicular sections, each section fitting between and flush against circumferentially extending, facing surfaces of respective ones of the bearing seat 66 of the cover plate 62 and the bearing seat 54 of the outer pivot plate 48. The bearings 66 and 68 also provide seals, preferably metal to metal seal, to sealingly enclose the suspension arm housing 60.

The suspension arm 20 further includes a fluid control section 90 which is disposed interiorly within suspension arm 20. The fluid control section 90 includes a fluid manifold 98, a fluid reservoir 102, an accumulator 104, a pump motor 106 and a pump 108, which are mounted within the suspension arm housing 60 of the suspension arm 20. Fluid connections 96 are provided for passing fluid into and out of the compressible fluid strut 32. The manifold 98 is connected to the tubing connections 96 by tubing 100 (shown in FIG. 7). The fluid reservoir 102 provides a supply of compressible fluid to an inlet of the pump 108. The pump motor 106 is preferably an electric motor, and the pump 108 is preferably a piston pump. The accumulator 104 is connected to the discharge of the pump 108 and is preferably of the type which includes a chamber having a floating piston which seals a nitrogen charge disposed on one side of the chamber from a volume of the compressible fluid disposed on an opposite side of the chamber. The accumulator 104 provides a ready supply of pressurized compressible fluid for selectively passing into the compressible fluid strut 32. Control valves 110 and 112, in combination with check valves 114, 116 and 118, and a pressure bypass valve 120, control the flow of compressible fluid between the control section 90 and the compressible fluid strut 32.

Figure 6:
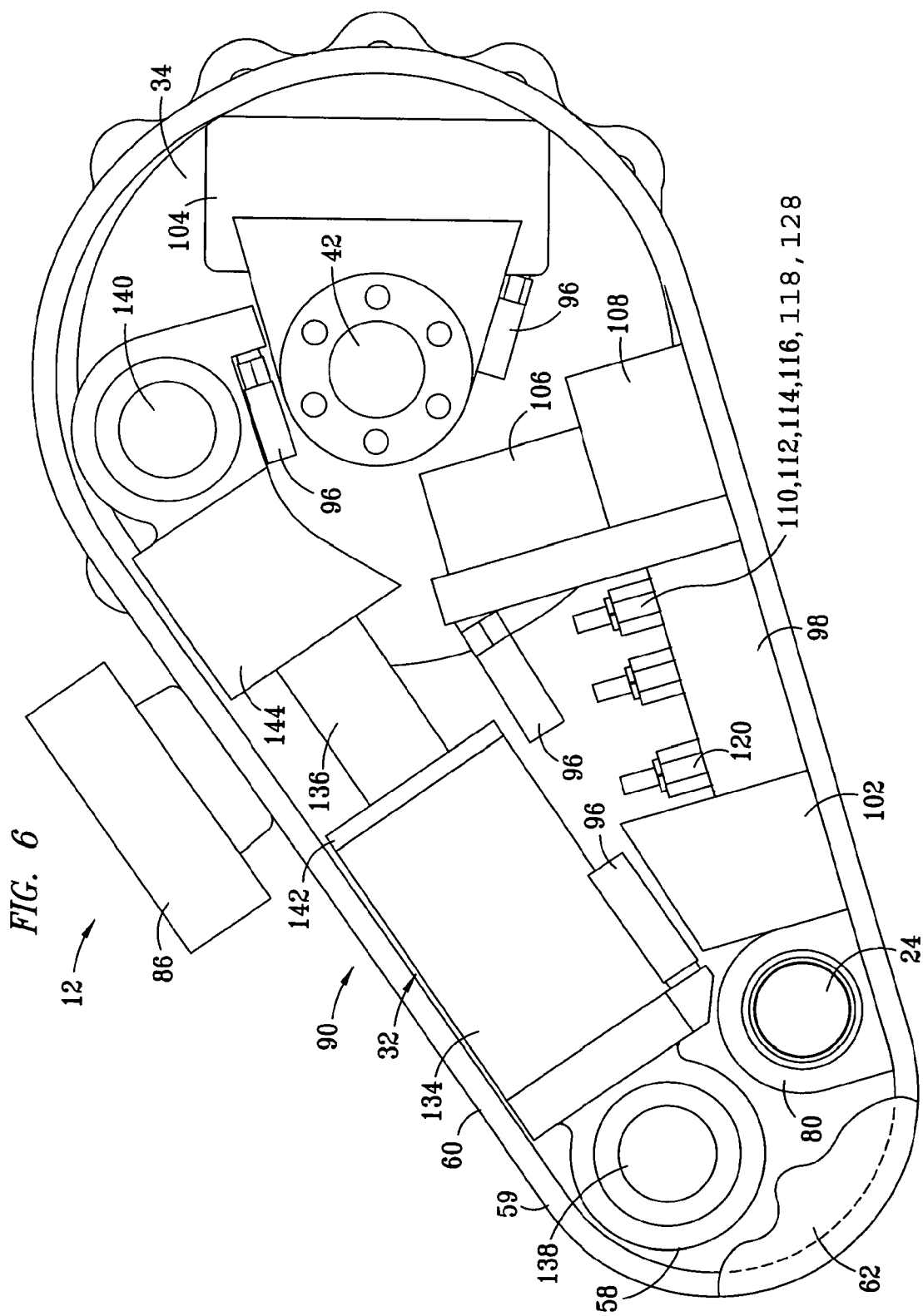

FIG. 6 is a side elevation view of the suspension arm 20 after assembly, with the cover plate 62, the outer pivot plate 48 and the tubing 100 removed. The compressible fluid cylinder 32 is shown with the bearing assembly 138 disposed for rotatably securing the cylinder 134 to the moveable support pin 74 and the bearing assembly 140 disposed for rotatably securing the piston rod 136 to the stationary support pin 56. The spindle support 80 secures the spindle 24 to the suspension arm housing 60. The fluid manifold 98, the fluid reservoir 102, the accumulator 104, the motor 106 and the pump 108 are shown in respective positions within the suspension arm housing 60. Tubing connections 96 are shown connected to respective ones of the manifold 98, the accumulator 104, and the compressible fluid strut 32. The bump stop 86 is shown mounted to the top of the suspension arm housing 60.

Figure 7:
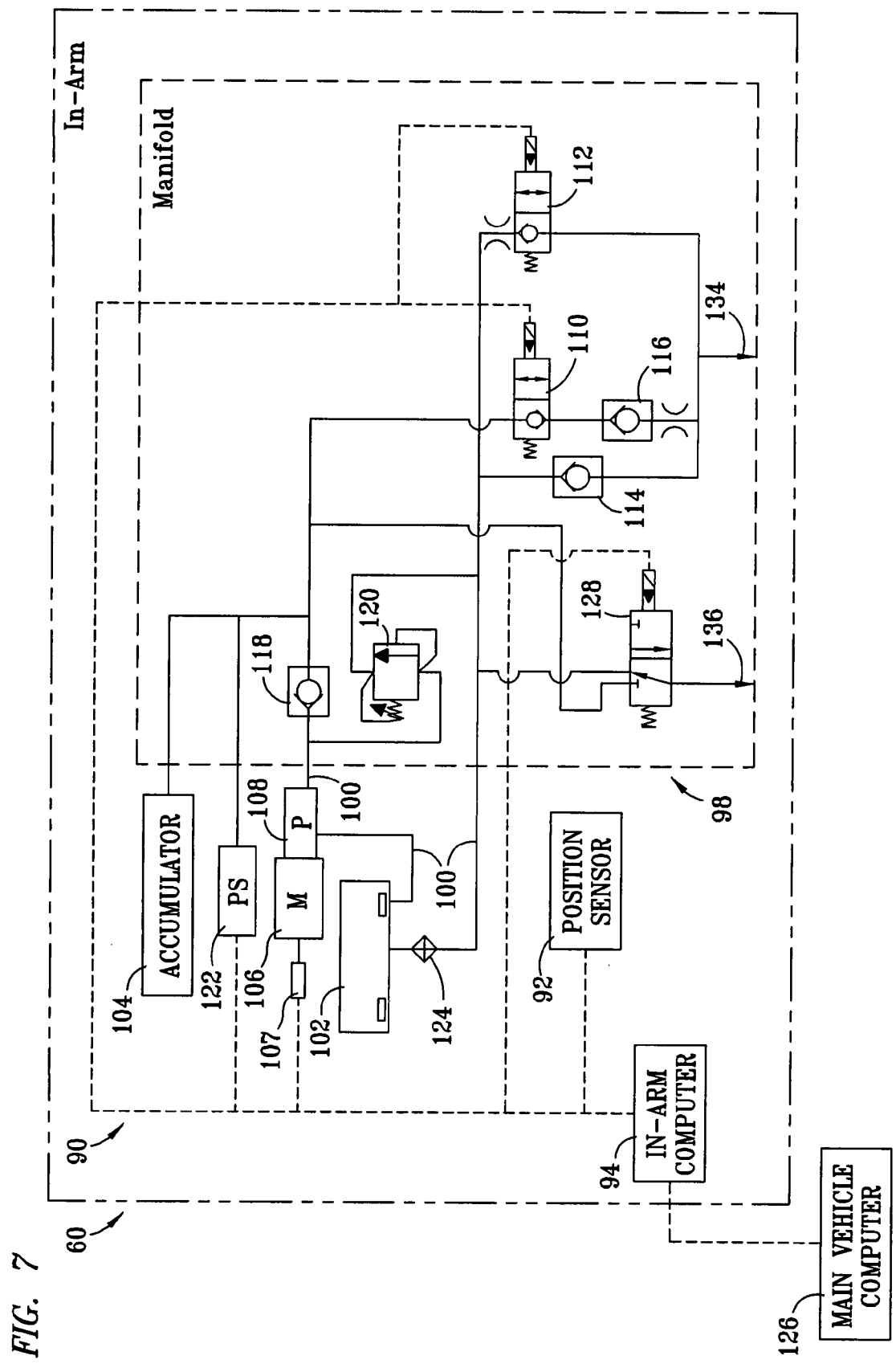

FIG. 7 is a schematic diagram mounting diagram of the fluid control section 90. A position sensor 92 is mounted to the suspension arm 20 for determining the angular displacement 30 of the arm 20, or the ride height displacement 28 of the wheel 16, from a reference datum. An in-arm computer 94 may also be provided either within the suspension arm 20, or mounted directly to the suspension arm 20. In some embodiments, a main vehicle computer 126 may control operation of the fluid control section 90 in conjunction with the in-arm computer 94. In other embodiments, either only the in-arm computer 94 may be provided or the main vehicle computer 126 for controlling operation of the fluid control section 90 and the suspension arm 20. The electrically operated control valves 110 and 112 control charging and discharge, respectively, of compressible fluid within the strut 32. The check valves 114, 116 and 118 allow fluid flow in only one direction. Tubing 100 connects between the manifold 98 and various components of the fluid control section 90. A pressure sensor 122 is connected in the manifold 98 for sensing the pressure of the compressible fluid in the accumulator 104. A pump switch 107 is provided for controlling operation of the pump motor 106. A filter 124 is provided in the return flow line to the fluid reservoir 102. A fluid control valve 128 is connected to the supply line extending from the accumulator 104 and the discharge of the pump 108 for passing fluid into the flow port 202 extending through the piston rod 136 to the damper lock 210. (See FIG. 8). The fluid control valve 128 is preferably a three way, two position solenoid valve which is electrically operated by the in arm computer 94, or in the alternative by the main computer 126. Preferably, the operator will selectively operate the valve 128 to lock down the damper such that fluid will not flow through the damper piston 174, preferably when the vehicle is in a stationary position. If the vehicle is being moved and firing on the move, the fluid control valve 128 will not apply fluid to lock down or prevent fluid flow through the damper piston 174.

Figure 8:
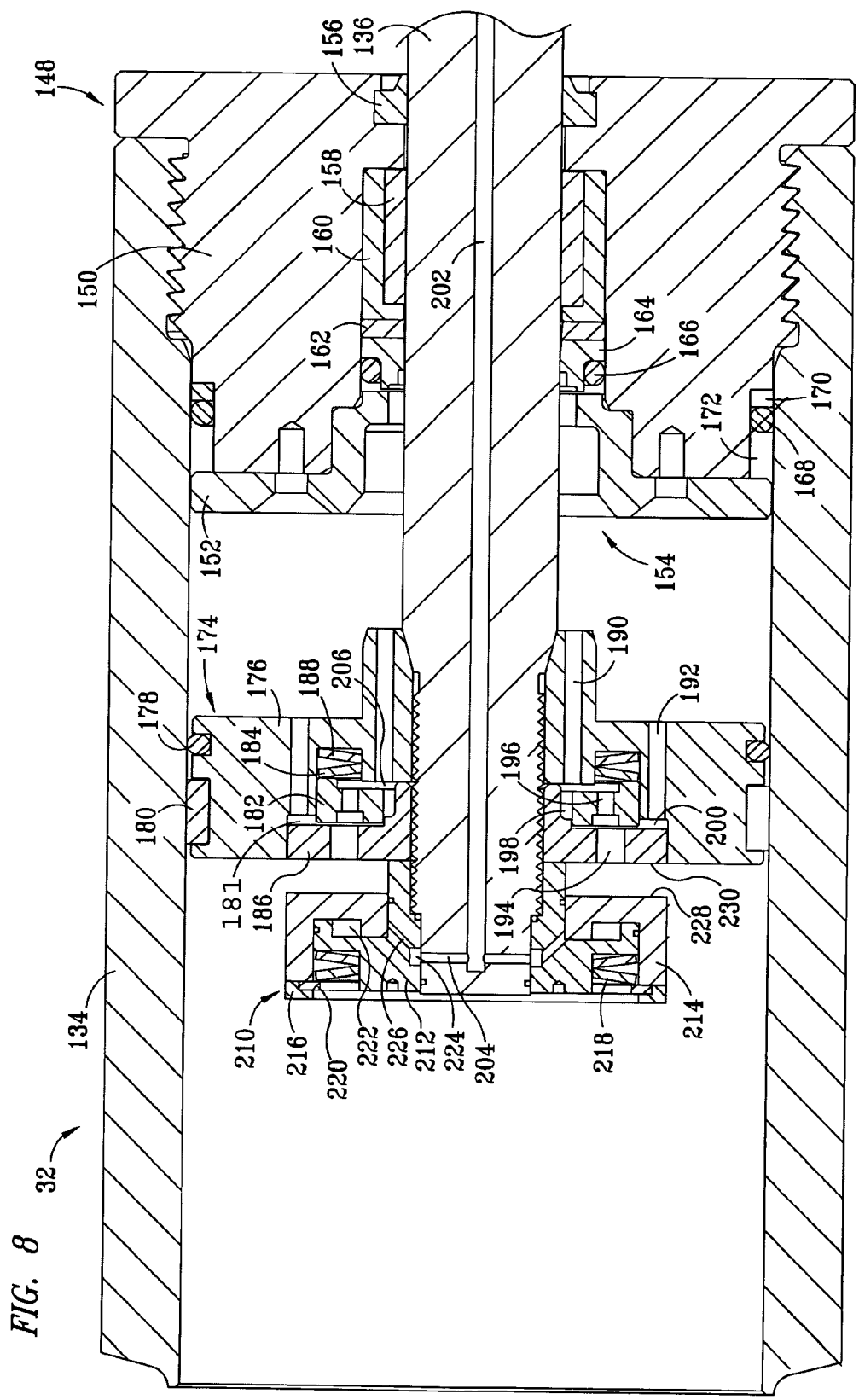

FIG. 8 is a longitudinal section view of the compressible fluid strut 32. The piston rod 136 is shown extending into the cylinder 134 with a seal gland 148 sealingly engaging between the piston rod 136 and the cylinder 134. The seal gland includes a threaded ring 150 which is threadingly secured to the interior of the cylinder 134. A lock ring 152 is secured to the inward end of the threaded ring 150, preferably by threaded fasteners. The lock ring retains an inner seal assembly 154 in sealing engagement between the interior of the threaded ring 150 and the exterior diameter of the piston rod 136. The inner seal assembly 154 includes a wiper seal 156, a rod bearing 158, a bearing sleeve 160, a back up ring 162, a seal 164, and an O-ring 166 which energizes the seal 164. An O-ring 168 and a backup ring 170 are secured in a seal gland 172 to sealingly engage between the interior of the cylinder 134 and the exterior of the threaded ring 150.

A damper piston 174 is secured to an inwardly disposed portion of the piston rod 136. The damper piston 174 has a main body 176, a seal 178, preferably provided by an O-ring, and a wiper ring 180. The seal 178 sealingly engages between the interior of the cylinder 134 and the exterior of the damper piston 174. The forward face of the main body 176 has a stepped groove 181 within which a moveable valve member 182 and a lock ring 186 are secured. The moveable valve member 182 preferably provides a damper plate, and is a ported ring which is selectively moved in response to fluid pressure applied on opposite sides of the damper piston 174, depending on whether the strut 32 is in a bounce or a rebound condition. Two bevel washer rings 184 and 188 preferably bias the moveable valve member 182 into the position shown in FIG. 8. Movement of the piston rod 136 and the damper piston 172 inwardly into the cylinder 134 at a sufficient rate will apply fluid pressure against the moveable valve member 182 to move it in a direction towards the seal gland 148, increasing flow through the damper piston 174. This will occur during a strong jounce, in a bounce mode. In a rebound mode, the fluid pressure will not be applied to the forward face of the moveable valve member 182, and bevel washer rings 184 and 188 will retain the moveable valve member 182 in a position disposed against a rearward face of the lock ring 186.

Flow ports 190 and 192 extend longitudinally through the main body 176 of the damper piston 174, interconnecting between the stepped groove 181 in the inward face of the main body 176 and the outward end of the damper piston 174. Flow ports 194 are provided to extend through the lock ring 186. Flow ports 196 also extend through the moveable valve member 182, connecting between the flow ports 194 in the lock ring 186 and a fluid flow chamber defined by a portion of the stepped groove 181 in the face of the main body 176 which extends to only the flow port 190. Movement of the moveable valve member 182 during a jounce, and bounce mode, will push the moveable valve member 182 outward, towards the seal gland 148, opening a flow path 198, and also opening a flow path from the port 194 to the portion of the stepped groove 181 defining the flow path 200 which is in communication with the flow ports 192, increasing flow through the damper piston 174 by passing the compressible fluid through the flow ports 192 in addition to the flow ports 190.

A damper lock 210 is preferably provided on the interior end of the piston rod 136. A flow path 202 is provided by a bore extending longitudinally through the piston rod 136, from exterior of the cylinder 134 to radially extending flow ports 204 for passing fluid into the damper lock 210. The damper lock 210 has a lock body 212, providing a manifold for passing fluid to a piston 214. A lock ring 216 is provided for securing the piston 214 to the lock body 212. Bevel washers 218 are secured between a retaining ring 220 engaging the lock ring 216 and the piston 214. A pressure chamber 222 is defined to circumferentially extend between the piston 214 and the lock body 212. A groove 224 extends around an interior circumference of the lock body 212 and connects to flow ports 226 for passing fluid from the flow ports 204 and the piston rod 136 to the pressure chamber 222. When pressure is applied within the pressure chamber 222, the forward face 228 of the piston 214 will extend to press the forward face 228 of the piston 214 against the face 230 of the lock ring 186 to seal fluid flow through the flow ports 194, which seals fluid flow through the damper piston 174. This allows an operator of a vehicle to lock the vehicle in a stable position to provide a stable firing platform. Preferably compressible fluid used as a spring fluid within the compressible fluid strut 32 is used for a hydraulic fluid for operating the damper piston of the damper lock 210. In other embodiments, other types of hydraulic fluids may be used, or the damper lock 210 may instead be electrically or magnetically actuated, or mechanically actuated as well.

Figure 9:
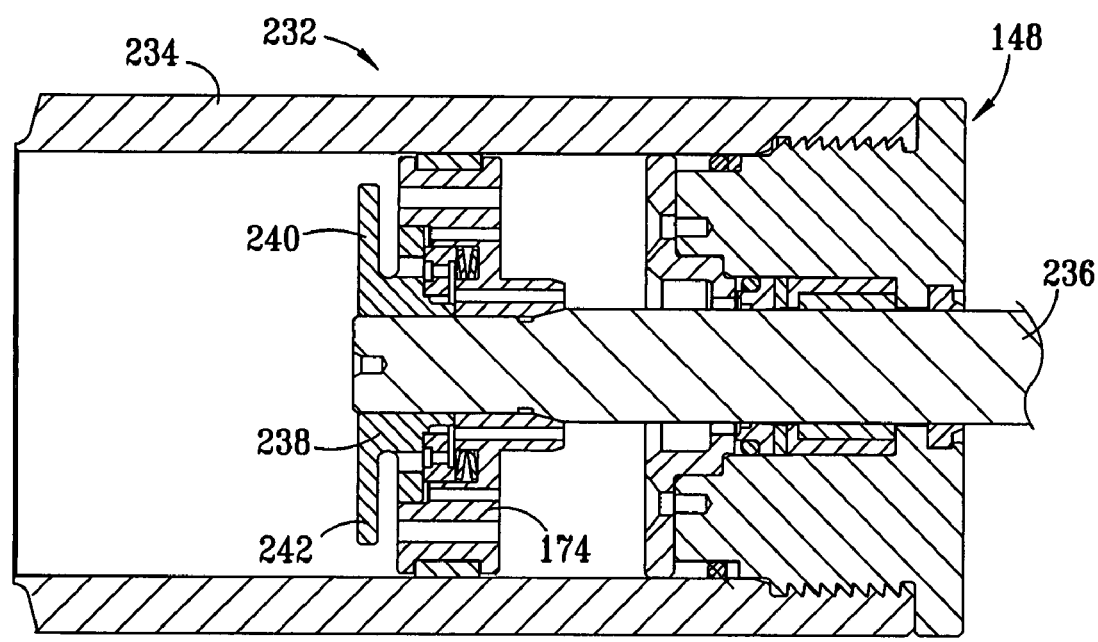

FIG. 9 is an alternative strut 232 made according to the present invention. The strut 232 has a cylinder 234, and a piston rod 236 which moveably extends into the cylinder 234. A seal gland 148 is provided for sealingly engaging between the end of the cylinder 234 and the piston rod 236. A damper piston 174 is provided similar to that shown in FIG. 8, except that the lock ring 186 of FIG. 8 is replaced with a lock ring 238 having a forward portion 240 with protrusions 242.

Preferably, the compressible fluid struts 32 and 232 are used with a silicon based compressible fluid. The O-rings for the struts 32 and 232 are preferably formed of nitrile, and the inner and outer rod seals are preferably formed of PCTFE Neoflon, available from Afton Plastics, Inc. Bearings for the struts 32 and 232 are preferably formed of a wound fiberglass which is coated with teflon. Cushions rings, bumpers and back up rings are preferably formed of nylon. The bearing seal rings 68 and 70 are preferably cast of a self lubricating material with good sealing characteristics, such as a stellite alloy.

Thus the advantages of this invention provides an in-arm, active suspension system, self-contained within a housing of a single suspension arm. A fluid pressure and control system is mounted directly within the housing of the arm with a compressible fluid strut. A damper piston is provided within the strut, mounted to the end of a piston rod. A damper lock is provided for selectively locking against the damper piston to prevent fluid flow through the damper piston and providing a stable platform. The fluid control system, including the fluid reservoir and all fluid components, are fully sealed within the housing of the suspension arm. Thus, the in-arm active suspension system of the present invention provides a fully self-contained, sealed enclosure in which the active suspension components are fully enclosed, with only electrical connections necessary to enter the housing, protecting the components of the active suspension system.

Although the preferred embodiment has been described in detail, it should be understood that various changes, substitutions and alterations can be made therein without departing from the spirit and scope of the invention as defined by the appended claims.

What is claimed is:

1. An in-arm suspension for supporting a frame, comprising:

a stator mounted to the frame, said stator including a mounting flange having a mounting boss, and an outer pivot plate fixedly secured to said mounting boss of said mounting flange to fixedly secure said outer pivot plate to said mounting flange:

said mounting flange and said outer pivot plate each having circumferentially extending stator surfaces disposed in opposed relation, with said stator surface of said mounting flange spaced apart from said stator surface of said outer pivot plate;

a suspension arm defining a housing having a first housing end a second housing end, with said first housing end having two circumferentially extending housing surfaces disposed in registration on opposite sides of said housing, and said second housing end secured to a spindle, with said spindle spaced apart from said housing surfaces:

a first bearing and a second bearing adapted for securing between respective ones of said housing surfaces and said stator surfaces to rotatably secure said housing to said mounting flange and said outer pivot plate, with respective ones of said housing surfaces disposed in opposed relation to corresponding ones of said stator surfaces with said bearings disposed therebetween;

a compressible fluid strut mounted within said housing of said suspension arm, said compressible fluid strut having a cylinder and a piston rod, wherein said piston rod is urged to move from within said cylinder in response to pressure applied to a compressible fluid disposed within said cylinder, wherein a first strut end of said compressible fluid strut is secured to said housing and a second strut end is secured to said stator, with at least one of said first and second strut ends spaced apart from at least one of a corresponding one of a central axis of said stator and a central axis of said spindle; and a fluid control section disposed within said housing of said suspension arm, said fluid control section having a fluid reservoir, a manifold, a pump and a pump motor, and including valves for selectively operating to actively control flow of said compressible fluid into and out of said compressible fluid strut.

2. The in-arm suspension according to claim 1, wherein said stator includes a peripheral edge portion from which extends a stationary support pin defined by a cylindrically-shaped boss to which said second end of said strut is secured, wherein said stationary support pin is offset from a centerline of an axis of rotation of said housing about said stator.

3. The in-arm suspension according to claim 1, wherein said housing of said suspension arm comprises a sidewall portion, a continuous enclosure portion which extends adjacent to a peripheral edge of said sidewall portion, and a cover plate for securing to a side of said continuous enclosure portion opposite which disposed opposite said sidewall portion, wherein said compressible fluid strut and said fluid control section is disposed within said continuous enclosure portion, between said sidewall portion and said cover plate.

4. The in-arm suspension according to claim 3, wherein said cover plate includes a moveable support pin defined by a cylindrically-shaped boss to which said first end of said strut is secured, and said moveable support pin is spaced apart form a central axis of said spindle.

5. The in-arm suspension according to claim 1, further comprising a fluid damper piston secured to an inward portion of said piston rod of said compressible fluid, said fluid damper having flow passages for passing compressible fluid through said fluid damper in response to movement of said piston rod within said cylinder.

6. The in-arm suspension according to claim 5, further comprising a damper lock for selectively actuating to move close said flow passages from passing compressible fluid through said fluid damper.

7. The in-arm suspension according to claim 5, further comprising a damper lock having a piston for selectively actuating to move said piston relative to said fluid damper piston close said flow passages from passing compressible fluid through said fluid damper.

8. The in-arm suspension according to claim 5, further comprising:

said piston rod having a flow path extending through from a portion of said piston rod exterior of said cylinder to a portion of said piston rod disposed within said cylinder;

a damper lock disposed proximate to said piston rod and said fluid damper piston, said damper lock having a piston which is moved in response to fluid pressure selectively applied within said flow path of said piston rod to seal said flow passages of said fluid damper piston to prevent flow of said compressible fluid through said fluid damper piston; and wherein said fluid control section further includes valving and for selectively applying said fluid pressure to said flow path of said piston rod.

9. An in-arm suspension for supporting a frame, comprising:

a stator mounted to the frame;

a suspension arm having a first end a second end, with said first suspension arm end rotatably mounted to said stator and said second end suspension arm end secured to a spindle;

a compressible fluid strut mounted directly to said suspension arm, said compressible fluid strut having a cylinder and a piston rod, wherein said piston rod is urged to move from within said cylinder in response to pressure applied to a compressible fluid disposed within said cylinder, wherein a first strut end of said compressible fluid strut is secured to said suspension arm and a second strut end is secured to said stator, with at least one of said first and second strut ends spaced apart from at least one of a corresponding one of a central axis of said stator and a central axis of said spindle;

a fluid damper piston secured to an inward portion of said piston rod of said compressible fluid, said fluid damper having flow passages for passing compressible fluid through said fluid damper in response to movement of said piston rod within said cylinder;

said piston rod having a flow path extending through from a portion of said piston rod exterior of said cylinder to a portion of said piston rod disposed within said cylinder;

a damper lock disposed proximate to said piston rod and said fluid damper piston, said damper lock having a piston which is moved in response to fluid pressure selectively applied within said flow path of said piston rod to seal said flow passages of said fluid damper piston to prevent flow of said compressible fluid through said fluid damper piston; and a fluid control section mounted directly to said suspension arm, said fluid control section having a fluid reservoir, a manifold, a pump and a pump motor, and including valves for selectively operating to actively control flow of said compressible fluid into and out of said compressible fluid strut and for selectively applying said fluid pressure to said flow path of said piston rod.

10. The in-arm suspension according to claim 9, wherein said stator comprises a mounting flange having a mounting boss, and an outer pivot plate fixedly secured to said mounting boss of said mounting flange.

11. The in-arm suspension according to claim 10, wherein said outer pivot plate has an outer peripheral surface which circumferentially extends to define a pivot plate bearing surface for said suspension arm, and a peripheral edge portion from which extends stationary support pin defined by a cylindrically-shaped boss to which said second end of said strut is secured.

12. The in-arm suspension according to claim 11, wherein said stationary support pin is offset from a central axis of said stator.

13. The in-arm suspension according to claim 11 wherein said suspension arm comprises a suspension arm housing having an open side and a cover plate which encloses said open side of said suspension arm housing to enclose said compressible fluid strut and said fluid control section within said suspension arm housing.

14. The in-arm suspension according to claim 13, wherein said cover plate includes a moveable support pin defined by a cylindrically-shaped boss to which said first end of said strut is secured.

15. The in-arm suspension according to claim 14, wherein said moveable support pin is spaced apart form a central axis of said spindle.

16. An in-arm suspension for supporting a frame, comprising:
a stator mounted to the frame, said stator including a mounting flange having a mounting boss, and an outer pivot plate fixedly secured to said mounting boss of said mounting flange to fixedly secure said outer pivot plate to said mounting flange:
said mounting flange and said outer pivot plate each having circumferentially extending stator surfaces disposed in opposed relation, with said stator surface of said mounting flange spaced apart from said stator surface of said outer pivot plate;
a suspension arm defining a housing having a first housing end a second housing end, with said first housing end having two circumferentially extending housing surfaces disposed in registration on opposite sides of said housing, and said second housing end secured to a spindle, with said spindle spaced apart from said housing surfaces:
a first bearing and a second bearing adapted for securing between respective ones of said housing surfaces and said stator surfaces to rotatably secure said housing to said mounting flange and said outer pivot plate, with respective ones of said housing surfaces disposed in opposed relation to corresponding ones of said stator surfaces with said bearings disposed therebetween;
a compressible fluid strut mounted within said housing of said suspension arm, said compressible fluid strut having a cylinder and a piston rod, wherein said piston rod is urged to move from within said cylinder in response to pressure applied to a compressible fluid disposed within said cylinder, wherein a first strut end of said compressible fluid strut is secured to said housing and a second strut end is secured to said stator, with at least one of said first and second strut ends spaced apart from at least one of a corresponding one of a central axis of said stator and a central axis of said spindle;
a fluid damper piston secured to an inward portion of said piston rod of said compressible fluid, said fluid damper having flow passages for passing compressible fluid through said fluid damper in response to movement of said piston rod within said cylinder;
said piston rod having a flow path extending through from a portion of said piston rod exterior of said cylinder to a portion of said piston rod disposed within said cylinder;
a damper lock disposed proximate to said piston rod and said fluid damper piston, said damper lock having a piston which is moved in response to fluid pressure selectively applied within said flow path of said piston rod to seal said flow passages of said fluid damper piston to prevent flow of said compressible fluid through said fluid damper piston; and
a fluid control section disposed within said housing of said suspension arm, said fluid control section having a fluid reservoir, a manifold, a pump and a pump motor, and including valves for selectively operating to actively control flow of said compressible fluid into and out of said compressible fluid strut and for selectively applying said fluid pressure to said flow path of said pistons rod.

17. The in-arm suspension according to claim 16, wherein said stator includes a peripheral edge portion from which extends a stationary support pin defined by a cylindrically-shaped boss to which said second end of said strut is secured, wherein said stationary support pin is offset from a centerline of an axis of rotation of said housing about said stator.

18. The in-arm suspension according to claim 17, wherein said housing of said suspension arm comprises a sidewall portion, a continuous enclosure portion which extends adjacent to a peripheral edge of said sidewall portion, and a cover plate for securing to a side of said continuous enclosure portion opposite which disposed opposite said sidewall portion, wherein said compressible fluid strut and said fluid control section is disposed within said continuous enclosure portion, between said sidewall portion and said cover plate.

19. The in-arm suspension according to claim 18, wherein said cover plate includes a moveable support pin defined by a cylindrically-shaped boss to which said first end of said strut is secured, and said moveable support pin is spaced apart form a central axis of said spindle.

* * * * *